Oct. 16, 1962 — G. BANERIAN — 3,058,786

COMPOSITE BEARING

Original Filed Feb. 3, 1956

INVENTOR.
GORDON BANERIAN

BY
ATTORNEY.

United States Patent Office 3,058,786
Patented Oct. 16, 1962

3,058,786
COMPOSITE BEARING
Gordon Banerian, Danville, Calif., assignor to Aerojet-General Corporation, Azusa, Calif., a corporation of Ohio
Original application Feb. 3, 1956, Ser. No. 563,305, now Patent No. 2,986,430, dated May 30, 1961. Divided and this application Mar. 11, 1960, Ser. No. 14,480
2 Claims. (Cl. 308—35)

This invention relates in general to bearings and more particularly has reference to a composite bearing for a high-speed shaft.

This is a divisional application of my copending application Serial Number 563,305, filed February 3, 1956, entitled Composite Bearing, now Patent No. 2,986,430.

The invention is susceptible of use in conjunction with vertically positioned shafts and may be modified in form to seat a vertical shaft or function as an end-thrust bearing, with the same advantages which will be described.

The composite bearing device forming the subject matter of this invention consists broadly of a sliding or plain bearing having a high-speed shaft journaled therein, incorporated in an anti-friction bearing. A clutch is provided for selective alternate operation of one or the other types of bearings, according to the relative efficiency of each at varying speeds of the shaft. Upon initiating rotation of the shaaft and operating the same at low speeds, the anti-friction bearing is employed and then as the speed of the shaft increases, the sliding bearing is made operative instead.

The efficiency of a sliding bearing is dependent upon maintenance of an adequate film of lubricant between the contact surfaces. This film is broken down when a shaft stands at rest as the lubricant is pressed out. This results in the metallic surfaces of the shaft and bearing coming in direct contact. When rotation of a shaft is commenced in a sliding bearing without a sufficient sustaining film of lubricant, destructive scoring and abrading may result, particularly under heavy loading.

An anti-friction bearing functions most efficiently under conditions of starting and rotation of a shaft at low speeds, requiring less energy to overcome torque and less lubrication, as there is a minimum of surface contact. This type of bearing has definite inherent limitations, which are well known in the art, and does not have the capacity, as does a sliding bearing, to operate so effectively with a shaft rotating at high speed.

In the practice of the present invention, an anti-friction element forming a part of the composite bearing is employed upon begining rotation of a shaft, as has been mentioned, and while a sufficient sustaining film of lubricant is built up between the shaft and a sliding element, at speeds which do not tax its capacity. The load is transferred to a sliding element as the speed of rotation of the shaft increases, before such capacity is reached.

The disadvantages which have attended the use of either an anti-friction or sliding bearing, solely, are thus overcome and utilization made of the highly desirable characteristics of each.

It has been previously sought to combine anti-friction and sliding bearings. The two types have been employed conjunctively, and a sliding bearing incorporated in an anti-friction bearing as a precaution against failure of the latter, being adapted to function only in the event of such a contingency. The concept, however, has not previously been reduced to practical application. For example, the prior combination anti-friction and sliding bearings have embodied a multiplicity of moving parts actuated by creation of an oil wedge as a function of the speed of the shaft. It is apparent that in such centrifugal devices there can be no flexibility of operation, as actuation is limited to a specific speed of the shaft coupled with the particular configuration of the moveable parts. Also these types of bearings have been capable of concomitant operation, a disadvantage sought to be overcome by this invention, as has been explained.

An object of this invention is to provide a composite bearing device for a high-speed shaft, embodying anti-friction and slidable elements capable of operating alternately in order to utilize the desirable characteristics of each as opposed to the other, and eliminate the inherent disadvantages heretofore attending use of either solely.

Another object of this invention is to provide a composite bearing device embodying an anti-friction element adapted to function upon initiating rotation of a high-speed shaft and during the period the same operates at low speed, and a slidable element for alternate functioning before the speed of rotation of the shaft reaches the capacity of the anti-friction element.

Still another object of this invention is to provide a composite bearing for a high speed shaft journaled in a sliding element which latter is allowed to rotate with the shaft in engagement with an anti-friction element when rotation of the shaft is commenced and while the same is operated at low speeds, in which the sliding element is adapted to be locked against rotation so that the shaft will rotate therein by engagement of a fluid pressure operated friction clutch therewith when the speed of the shaft reaches a predetermined value.

A further object of this invention is to provide a composite bearing for a high-speed vertical shaft embodying an anti-friction element for operation upon starting and as the speed of the shaft increases within the capacity thereof and a sliding element for alternate use before the speed of the shaft reaches the capacity of the anti-friction element.

With these and other objects in view which may be incident to the improvements provided by this invention, there is shown in the accompanying drawings and detailed description, an embodiment of the invention, together with a modification thereof, for carrying the same into practical effect in its useful applications. It will be understood, however, that the invention is in nowise limited to the precise details of construction, arrangement and design shown and described as it is apparent that many changes and variations may be made therein without departing from the spirit of the invention or exceeding the scope of the appended claims.

In the drawings forming a part of this specification:

Figure 1:
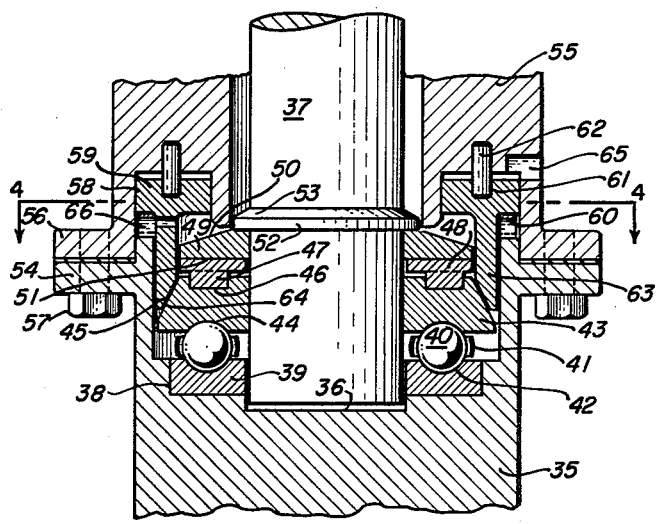
FIGURE 1 is a side sectional view of a form of the composite bearing for seating the end of a vertical high speed shaft.
Figure 2:
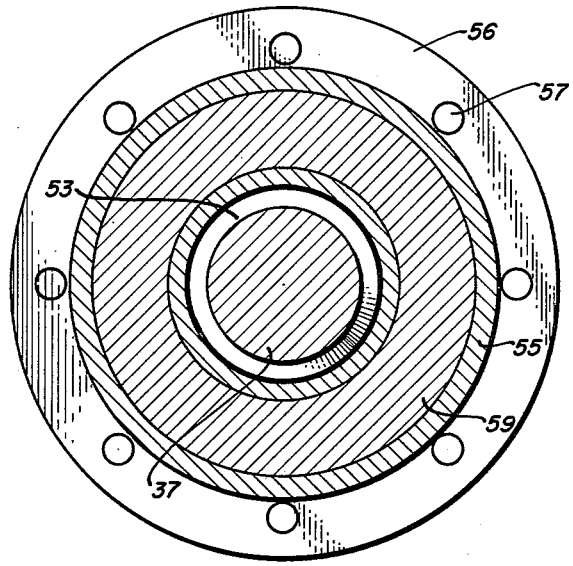
FIGURE 2 is a sectional view taken on line 4—4 of FIGURE 1, looking in the direction of the arrows.

In FIGURES 1 and 2 there is illustrated the preferred form of the invention adapted to seat a vertically positioned high-speed shaft or serve as a composite end-thrust bearing.

In this form of the invention, there is shown a split housing comprising a lower section 35, broken away at the bottom, adapted to be supported in any suitable manner. The lower section 35 is formed with a well 36 adapted to receive the lower end of a vertically positioned shaft. The well opens into a coaxial seat for a lower ball race 39 mounted around the shaft 37.

Ball bearings 40 spaced in a cage 41 are mounted in an annular groove provided on the upper face of the lower race as shown at 42. An upper ball race 43 having a corresponding annular groove on the lower face for receiving the ball bearings 40 as shown at 44 is mounted around the shaft 37. The upper race 43 is formed with a beveled periphery 45 and is normally adapted to rotate with the shaft 37. The upper face of the race 43 is further formed with an annular groove 46 which is adapted to fixedly seat an annular ring 47 integrally formed on the underside of a washer 48 mounted around the shaft, commonly termed in the art a "Kingsbury Washer."

A thrust washer 49 formed with a beveled top face 50 is fixedly mounted on the shaft 37, adapted to rest on the top face of the washer 48 to provide sliding bearing surfaces as indicated at 51. The shaft 37 is supported on the washer 49 with the end out of contact with the bottom of the well 36 by a collar 52 having a beveled top face 53 formed around or fixed to the shaft.

It will be apparent from the foregoing that when the shaft 37 is rotated an anti-friction bearing will be provided through the ball elements 40 as the friction thereon is far less than that between the sliding surfaces 51.

An integral collar 54 is formed around the outer periphery of the lower housing section 35, below the rim thereof. An upper housing section 55, shown broken away at the top formed with a lip 56 around the lower rim thereof, is adapted to be telescoped over the rim of the lower housing section and the collar 54 and lip 56 secured by cap nuts 57.

The upper housing section 55 is formed with a circular seat 58 for receiving an annular piston 59. The lower face of the piston 59 adjacent the periphery thereof is adapted to rest on a wave spring 60, supported on the rim of the lower housing section 35. The top face of the piston 59 is provided with seats 61 for receiving pins 62 fixedly seated around the bottom of the seat 58. The piston may thus slide up and down in relation to the pins but is fixed against rotation thereby.

A collar 63 is formed around the underside of the piston 59 adapted to be telescoped in the inner periphery of the lower housing section 35. The inner periphery of the collar 63 is beveled adjacent the rim thereof as shown at 64 for engagement with the beveled periphery 45 of the upper ball race 43. An aperture 65 is provided in the upper housing section 55 for admitting fluid under pressure to actuate the piston 59 against the action of the wave spring 60. An aperture 66 is provided in the collar 63 for the admission of lubricant.

When fluid under pressure sufficient for the piston to compress the wave spring 60 is introduced through the aperture 65, the beveled inner periphery 64 of the collar 63 carried thereby will frictionally engage the beveled outer periphery 45 of the upper race 43 and lock the same together with the washer 48 carried thereon against rotation with the shaft 37. The thrust washer 49 is thereby caused to slide on the washer 48 and the transfer from an anti-friction to a sliding bearing is effected.

There is accomplished by this invention a composite bearing for a high-speed shaft embodying an anti-friction element for operation upon starting and rotation of the shaft at low speeds within the capacity thereof, and a sliding element for alternate engagement when before the speed of the shaft reaches the capacity of the anti-friction element, in which a sustaining film of sufficient lubricant is maintained between the shaft and sliding element when operation of the latter is initiated so that the disadvantages heretofore attending the use of either type of bearing solely are eliminated and the desirable characteristics of each retained.

The invention as shown and described herein is in nowise limited to such illustration and description but is susceptible to variations and modifications and limited only as defined in the following claims.

I claim:

1. A composite thrust bearing for a vertically positioned shaft comprising: an antifriction bearing including an upper race, a lower race, and rolling bodies positioned therebetween, a sliding element positioned in sliding relation to said antifriction bearing upper race, and a collar positioned in spaced relation with said antifriction bearing and adapted to force the bearing races together to thereby lock said bearing races against relative rotation, said collar actuated independently of the bearing elements.

2. A composite thrust bearing for a vertically positioned shaft comprising: an antifriction bearing including an upper race, a lower race, and rolling bodies therebetween, said bearing circumventing said shaft, stationary elements in contact with said bearing lower race, a sliding element in contact with said bearing upper race and circumventing said shaft, said shaft having a projection thereon in contact with said sliding element, and a means for locking said bearing upper race to said stationary element, said locking means actuated independently of the bearing elements.

References Cited in the file of this patent

UNITED STATES PATENTS

| | | |
|---|---|---|
| 1,121,083 | De Ferranti | Dec. 15, 1914 |
| 1,596,090 | Florell | Aug. 17, 1926 |
| 2,623,353 | Gerard | Dec. 30, 1952 |